United States Patent
Skorka et al.

(10) Patent No.: US 11,917,272 B2
(45) Date of Patent: Feb. 27, 2024

(54) IMAGING SYSTEMS FOR MULTI-SPECTRAL IMAGING

(71) Applicant: SEMICONDUCTOR COMPONENTS INDUSTRIES, LLC, Phoenix, AZ (US)

(72) Inventors: Orit Skorka, Santa Clara, CA (US); Paul James Kane, Rochester, NY (US); David Wayne Jasinski, San Jose, CA (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 317 days.

(21) Appl. No.: 16/949,384

(22) Filed: Oct. 28, 2020

(65) Prior Publication Data
US 2022/0132089 A1 Apr. 28, 2022

(51) Int. Cl.
*H04N 23/11* (2023.01)
*H04N 9/64* (2023.01)
(Continued)

(52) U.S. Cl.
CPC ............. *H04N 23/11* (2023.01); *H04N 9/64* (2013.01); *H04N 17/002* (2013.01);
(Continued)

(58) Field of Classification Search
CPC ........ H04N 5/332; H04N 23/10; H04N 23/11; H04N 23/80
See application file for complete search history.

(56) References Cited

U.S. PATENT DOCUMENTS

2005/0098713 A1 5/2005 Holland
2006/0054787 A1* 3/2006 Olsen .................. G02B 3/0075
348/E5.037
(Continued)

OTHER PUBLICATIONS

Cultural Heritage Science Open Source, "Technical Photography and MSI calibration card" (archived Dec. 24, 2019), available at https://web.archive.org/web/20191224173635/https://chsopensource.org/technical-photography-msi-calibration-card/ (Year: 2019).*

(Continued)

*Primary Examiner* — David N Werner
(74) *Attorney, Agent, or Firm* — Treyz Law Group, P.C.; Tianyi He

(57) ABSTRACT

An imaging device may have an array of image pixels that includes red, green, blue, and infrared pixels. The imaging device may include a dual-band filter that allows transmission of light in the visible band and in the near-infrared band and may include color processing circuitry that produces a color image with marked infrared regions. The color processing circuitry may include a standard color processing pipeline with a color correction matrix that produces a tone-mapped standard red, green, and blue image and may include infrared marking circuitry. The infrared marking circuitry may include hue angle determination circuitry, cell means determination circuitry, and near-infrared determination circuitry that determine portions of the image with high infrared reflectance to be marked. The infrared-marked tone-mapped standard red, green, and blue image may be output to a machine vision system to identify objects in the imaged scene with high infrared reflection.

20 Claims, 7 Drawing Sheets

(51) Int. Cl.
*H04N 17/00* (2006.01)
*H04N 23/10* (2023.01)
*H04N 23/80* (2023.01)
*H04N 23/84* (2023.01)
*G02B 5/20* (2006.01)

(52) U.S. Cl.
CPC ............. *H04N 23/10* (2023.01); *H04N 23/80* (2023.01); *H04N 23/84* (2023.01); *G02B 5/20* (2013.01)

(56) References Cited

U.S. PATENT DOCUMENTS

| | | | |
|---|---|---|---|
| 2006/0066738 A1 | 3/2006 | Hershey et al. | |
| 2007/0183657 A1* | 8/2007 | Kidono | G06T 11/001 382/162 |
| 2008/0111894 A1* | 5/2008 | Tanimoto | H04N 9/04553 348/222.1 |
| 2014/0218538 A1 | 8/2014 | Choi | |
| 2015/0062347 A1 | 3/2015 | Jin | |
| 2016/0283791 A1* | 9/2016 | Ogura | G01N 21/251 |
| 2017/0064278 A1 | 3/2017 | Posselius et al. | |
| 2017/0353669 A1* | 12/2017 | Hayashi | G06V 10/56 |
| 2018/0069996 A1* | 3/2018 | Shukla | H04N 5/217 |
| 2018/0220052 A1* | 8/2018 | Granneman | A61B 5/0071 |
| 2019/0109984 A1* | 4/2019 | Good | H04N 23/74 |
| 2019/0174043 A1* | 6/2019 | Wang | H04N 9/07 |
| 2019/0350505 A1* | 11/2019 | Fukuda | A61B 5/14552 |
| 2020/0304732 A1* | 9/2020 | Finlayson | H04N 9/04515 |
| 2020/0374501 A1* | 11/2020 | Izuta | H04N 23/60 |
| 2021/0095978 A1* | 4/2021 | Letwin | G01C 21/3602 |
| 2021/0104028 A1* | 4/2021 | Gomer | G06T 5/50 |
| 2022/0311935 A1* | 9/2022 | Koga | G06T 7/11 |

OTHER PUBLICATIONS

J.H. Jang & J.B. Ra, "Pseudo-Color Image Fusion Based on Intensity-Hue-Saturation Color Space", Proc. of 2008 IEEE Int'l Conf. on Multisensor Fusion and Integration for Intelligent Systems (MFI) 366-371 (Aug. 2008) (Year: 2008).*

H. Luo, L. Xu, B. Hui, & Z. Chang, "Tone mapping infrared images using conditional filtering-based multi-scale retinex", 9675 Proc. SPIE 2D-1-6 (Oct. 8, 2015) (Year: 2015).*

D. Lamb, A. Hall, & J. Louis, "Airborne remote sensing of vines for canopy variability and productivity", Austl'n Grapegrower & Winemaker, Jan. 2001, at 449a (Year: 2001).*

* cited by examiner

IMAGING SYSTEMS FOR MULTI-SPECTRAL IMAGING

BACKGROUND

This relates generally to imaging devices, and more particularly, to imaging devices that include improved infrared light detection.

Image sensors are commonly used in electronic devices such as cellular telephones, machine vision systems, advanced driver assistance systems, cameras, systems for medical imaging, computers, and mobile devices to capture images. In a typical arrangement, an electronic device is provided with an array of image pixels arranged in pixel rows and pixel columns. Each image pixel in the array includes a photodiode that is coupled to a floating diffusion region via a transfer gate. Each pixel receives photons from incident light and converts the photons into electrical signals. Column circuitry is coupled to each pixel column for reading out pixel signals from the image pixels. Image sensors are sometimes designed to provide images to electronic devices.

Some image sensors include infrared pixels that convert infrared light photons to electronic signals with higher efficiency than visible light photons, in addition to pixels that generate electronic signals in response to various bands in the visible band and infrared light. Generally, signals from the infrared pixels are used to reduce the effects of infrared light on the visible light pixels when some infrared radiation is allowed to reach the image plane during image capture. However, in some applications, signals generated by the infrared pixels, as well as the effects of infrared light on signals that are generated by the visible light pixels, may be useful to include in one or more output images.

It would therefore be desirable to provide imaging devices having image sensors and processing circuitry with improved infrared light detection and processing.

DETAILED DESCRIPTION

Embodiments of the present invention relate to image sensors, and more particularly, to image sensors having pixels that are sensitive to infrared or near-infrared light, which may be used to produce images that include infrared-marking information. It will be recognized by one skilled in the art, that the present exemplary embodiments may be practiced without some or all of these specific details. In other instances, well known operations have not been described in detail in order to not unnecessarily obscure the present embodiments.

Imaging systems having digital camera modules are widely used in machine vision systems, advanced driver assistance systems, consumer use cameras, systems for medical imaging, mobile phones, electronic devices such as digital cameras, computers, cellular telephones, and other electronic devices. A digital camera module may include one or more image sensors that gather incoming light to capture an image. Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). Image sensors may include control circuitry such as circuitry for operating the image pixels and readout circuitry for reading out pixel signals corresponding to the electric charge generated by the photosensitive elements.

Image sensor pixels may be formed from semiconductor material, such as silicon, to absorb photons from light incident on the pixels and convert the photons into electrical signals. Image sensor pixels may detect light at any desired wavelength and may generally be overlapped by a color filter to only pass light of a certain wavelength band to the underlying pixels. For example, image sensor pixels may detect red, green, blue, infrared, or near-infrared lights. Some imaging systems may use information regarding infrared or near-infrared light obtained by infrared pixels to correct visible light image data (e.g., red, green, and blue image data) when all pixels are exposed to near-infrared light during image capture. In some circumstances, this may improve the accuracy of the visible light image data with respect to the visible light present in a scene, as artifacts produced by infrared light may be removed. However, in some applications, it may be desirable to maintain both the visible and infrared image data and to generate a single image that reflects the visible and infrared image data. For example, such information may allow systems to distinguish objects with different reflectance in an imaged scene. Therefore, it may be desired to form image sensors with multi-spectral image processing techniques.

Figure 1:
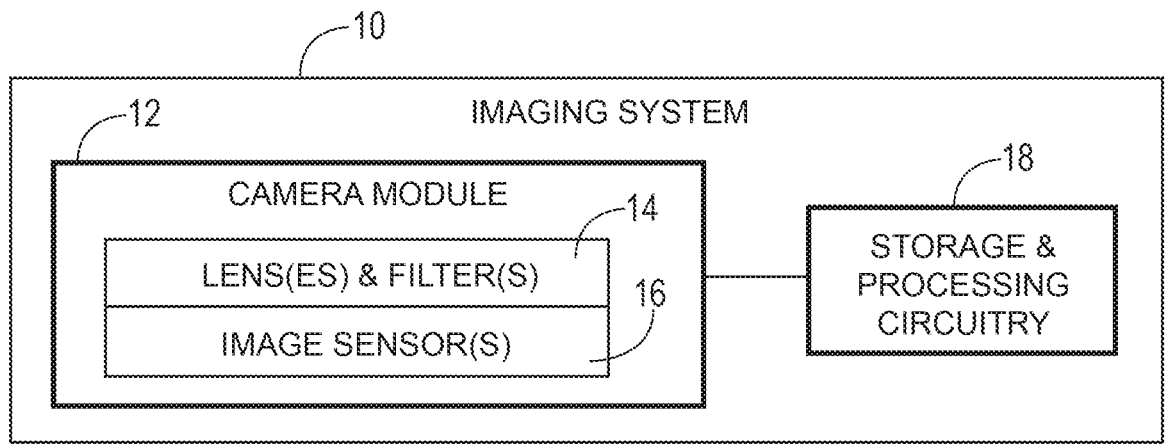
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses. During image capture operations, light from a scene may be focused onto image sensor 16 and filtered before reaching image sensor 16 by lenses and filters 14. Image sensor 16 may include circuitry for converting analog pixel data into corresponding digital image data to be provided to storage and processing circuitry 18. If desired, camera module 12 may be provided with one or more lenses 14 and one or more image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
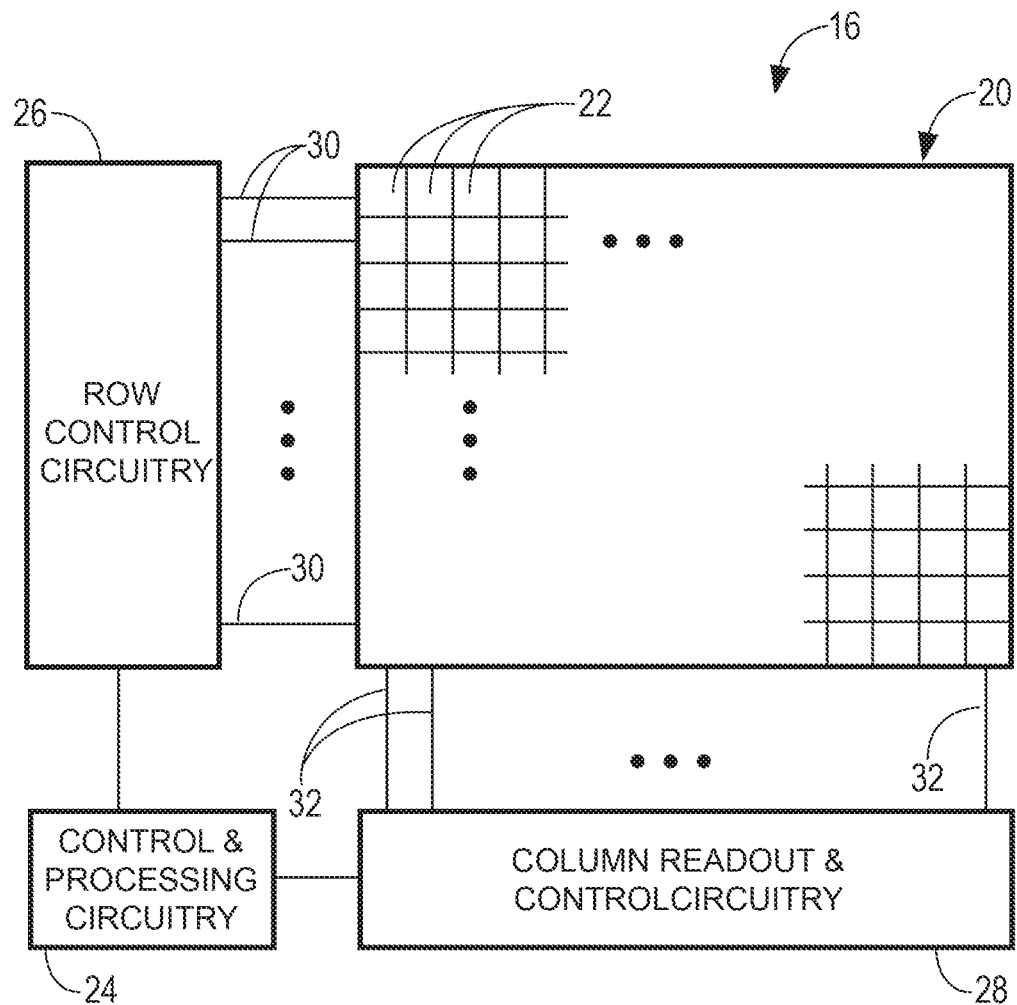
FIG. 2 is a diagram of an illustrative pixel array and associated readout circuitry for reading out image signals from the pixel array in accordance with an embodiment.

As shown in FIG. 2, image sensor 16 may include a pixel array 20 containing image sensor pixels 22 arranged in rows and columns (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32. Although pixels 22 have been described as analog pixels that generate charge in response to incident light, and the charge may then be read out through column lines 32, this is merely illustrative. Pixels 22 may instead be digital pixels, if desired.

Image readout circuitry 28 (sometimes referred to as column readout and control circuitry 28) may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) for pixels in one or more pixel columns.

If desired, image pixels 22 may include one or more photosensitive regions for generating charge in response to image light. Photosensitive regions within image pixels 22 may be arranged in rows and columns on array 20. Pixel array 20 may be provided with a color filter array having multiple spectral filter elements which allows a single image sensor to sample light of different wavelength bands. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). In other examples, array 20 may be arranged in a pattern other than a Bayer pattern. For example, array 20 may include infrared and/or near-infrared pixels (e.g., pixels that produce image signals in response to infrared or near-infrared light, respectively). These examples are merely illustrative and, in general, color filter elements of any desired spectral band of light and in any desired pattern may be formed over any desired number of image pixels 22.

Each pixel 22 may also be overlapped by a microlens, if desired. Each pixel 22 may be overlapped by a respective microlens, or groups of pixels 22 may be covered by microlenses. The microlenses may further focus incident light into the photosensitive regions within pixels 22.

Image sensor 16 may be configured to support a global shutter operation (e.g., pixels 22 may be operated in a global shutter mode) or may be configured to support a rolling shutter operation (e.g., pixels 22 may be operated in a rolling shutter mode).

Figures 3A, 3B:
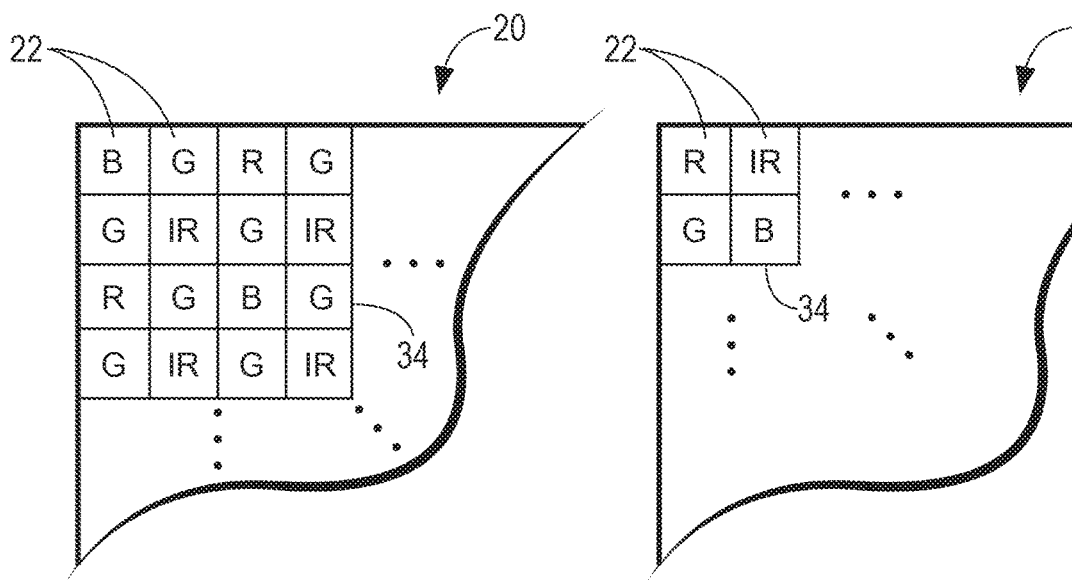
FIG. 3A is a diagram of an illustrative pixel array having repeating four-by-four units of red, green, blue, and infrared pixels in accordance with an embodiment.
FIG. 3B is a diagram of an illustrative pixel array having repeating two-by-two units of red, green, blue, and infrared pixels in accordance with an embodiment.

Pixel array 20 may include near-infrared pixels and/or infrared pixels (referred to collectively herein as infrared pixels). As shown in FIG. 3A, pixels 22 may include red, green, blue, and infrared pixels. Array 20 may be formed from repeating units of pixels. A first four-by-four illustrative unit cell 34 is shown in FIG. 3A. Pixel unit 34 may include a first blue pixel, a first green pixel, a first red pixel, and a second green pixel along a top row of unit 34; may include a third green pixel, a first infrared pixel, a fourth green pixel, and a second infrared pixel along a second row of unit 34; may include a second red pixel, a fifth green pixel, a second blue pixel, and a sixth green pixel along a third row of unit 34; and a seventh green pixel, a third infrared pixel, an eighth green pixel, and a fourth infrared pixel along a bottom row of unit 34. Pixel cell unit 34 may then be repeated horizontally and vertically across array 20. Another illustrative pixel cell unit 34 is shown in FIG. 3B.

As shown in FIG. 3B, pixel cell unit 34 may be a two-by-two unit cell. In particular, pixel cell unit 34 may include a red pixel and an infrared pixel in a top row of pixel cell unit 34 and a green pixel and a blue pixel in a bottom row of pixel cell unit 34. Pixel cell unit 34 may then be repeated horizontally and vertically across array 20. However, the type and number of pixels 22 used in pixel cell unit 34 are merely illustrative. In general, pixel unit 34 may include pixels that are responsive to any other color or wavelength range, and may be any desired size. For example pixel unit 34 may include clear/white pixels, yellow pixels, or any other desired pixels, and may be a 2×2 repeating cell, 4×4 repeating cell, or a cell of any other desired size. Moreover, the infrared pixels in array 20 may include one or more infrared pixels that are sensitive to the same range of infrared wavelengths, or may include one or more infrared pixels that are sensitive to different infrared wavelengths. In one example, a first set of infrared pixels in array 20 may be sensitive to near-infrared wavelengths, while a second set of infrared pixels in array 20 may be sensitive to infrared wavelengths. In general, however, both the infrared and color pixels may be sensitive to any desired wavelengths. Additionally, array 20 may include any desired number of repeating units 34 (i.e., array 20 may be any desired size).

Figure 4:
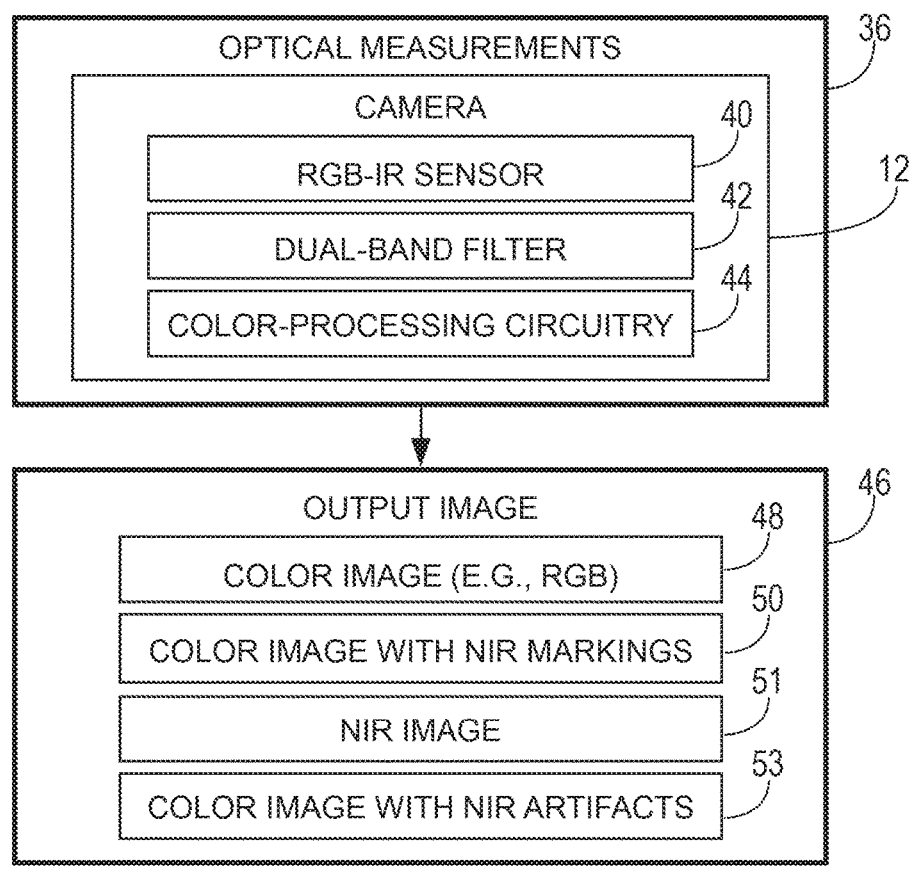
FIG. 4 is a diagram of illustrative optical measurements that may be taken with an infrared-sensitive camera to produce an infrared-labeled image and other images in accordance with an embodiment.

Camera module 12, which includes image sensor 16 with pixel array 20, may be used to capture images (i.e., may be used to take optical measurements of a scene). As shown in FIG. 4, optical measurements 46 may be taken using camera 12. Camera 12 may include RGB-IR sensor 40, dual-band filter 42, and color-processing circuitry 44. RGB-IR sensor 40 may include red, green, and blue pixels, as well as infrared pixels (e.g., as shown in FIG. 3A or 3B) and may produce a raw RGB-IR (red, green, blue, and infrared) image using the pixels. Dual-band filter 42 may be used to allow visible-band and infrared (or near-infrared) photons to reach the image plane and result in generation of image signals by pixels of the RGB-IR sensor 40, which are passed to the color-processing circuitry 44. A graph showing illustrative transmission characteristics of dual-band filter 42 is shown in FIG. 5.

Figure 5:
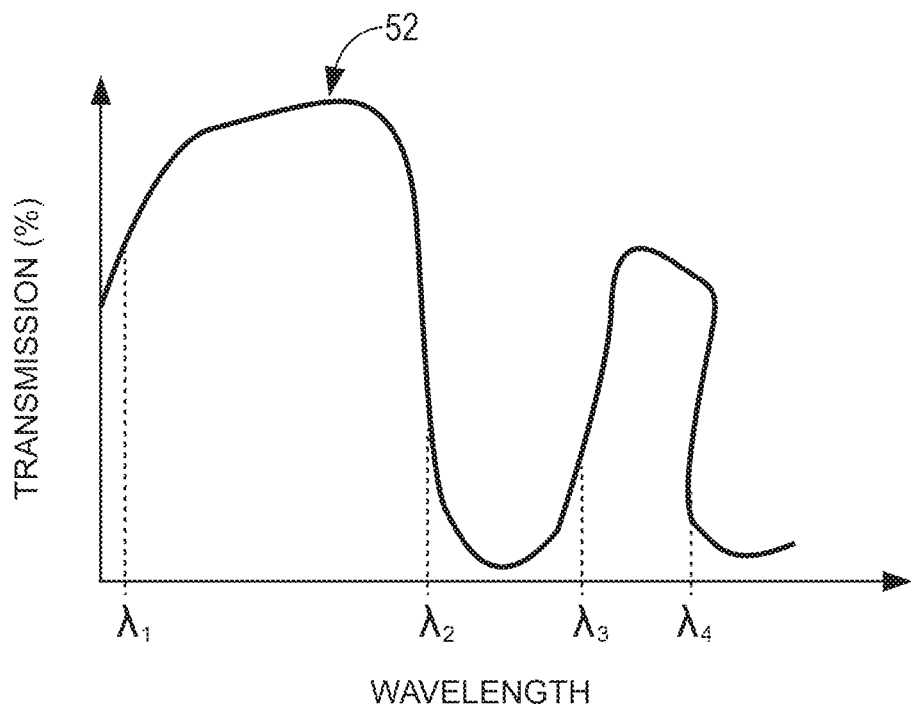
FIG. 5 is a graph of illustrative transmission values through a dual-band filter in accordance with an embodiment.

As shown in FIG. 5, dual-band filter 42 may have a transmission spectrum given by curve 52. The transmission spectrum may have one or more pass bands in the visible and NIR bands. For example, dual-band filter 42 may pass over 50% of light between $\lambda_1$=400 nm and $\lambda_2$=650 nm, and may pass over 50% of light between $\lambda_3$=800 nm and $\lambda_4$=900 nm. However, these wavelengths are merely illustrative. In general, dual-band filter 42 may transmit a majority of light across visible wavelengths and in a portion of near-infrared and/or infrared wavelengths. For example, dual-band filter 42 may transmit more than 50% of light, more than 60% of light, more than 70% of light, less than 90% of light, or any other desired amount of light across visible and a portion of infrared (or near-infrared) wavelengths. Although FIG. 5 shows the use of two pass bands, a filter with three or more pass bands may be used, if desired. For example, a tri-band filter may include a first pass band in the visible spectrum, a second pass band at 850 nm, and a third pass band at 940 nm, as examples. In general, filter 42 may have pass bands at any desired wavelengths. When coupled with RGB-IR sensor 40, filter 42 may allow image signals in desired visible and infrared wavelength ranges to pass.

Figure 6:
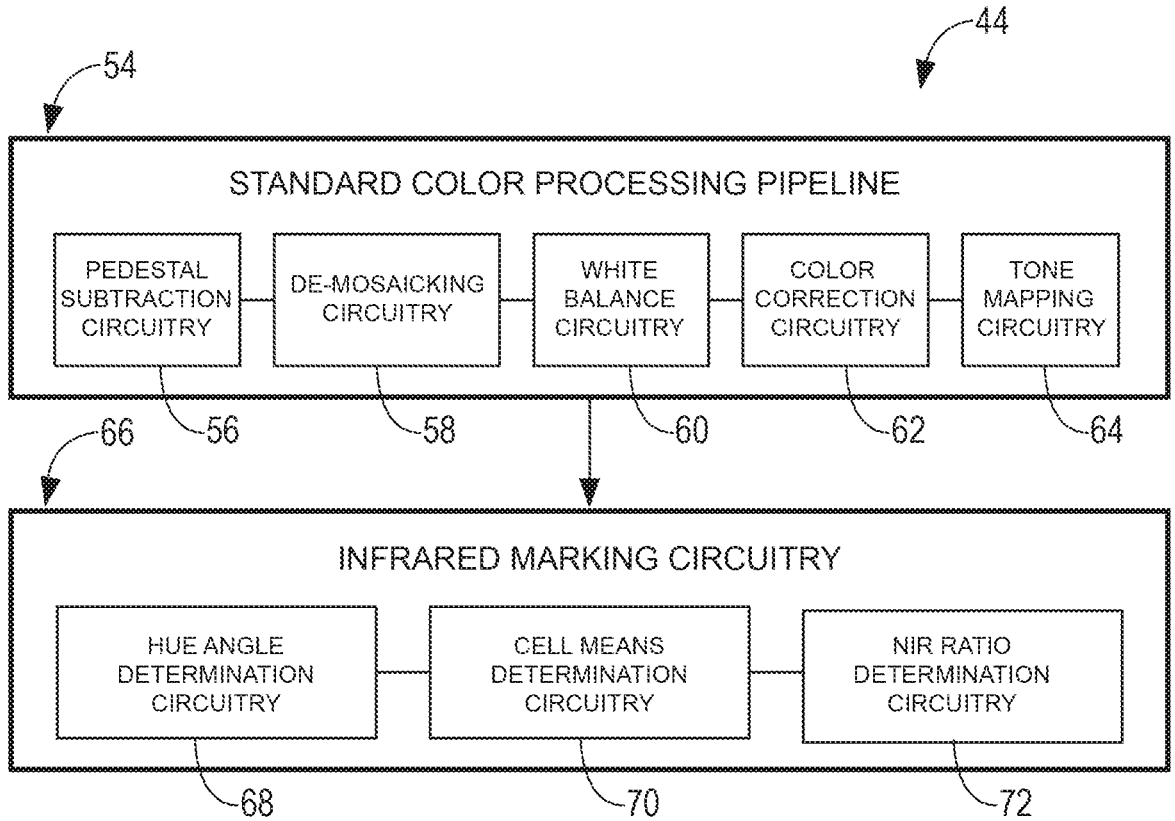
FIG. 6 is a diagram of illustrative color-processing circuitry that may be included in an infrared-sensitive camera in accordance with an embodiment.

As shown in FIG. 4, camera 12 may also include color-processing circuitry 44 (also referred to as processing circuitry 44 herein), which is shown in FIG. 6. As shown in FIG. 6, color-processing circuitry 44 may include standard color processing pipeline 54. Standard color processing pipeline 54 may convert the raw RGB-IR image produced by RGB-IR sensor 40 of FIG. 4 into a color-corrected tone-mapped sRGB image (also referred to as a standard red, standard green, and standard blue image herein—e.g., an image that has been demosaicked and been corrected with a color correction matrix (CCM)) with infrared or near-infrared color artifacts. In other words, standard color processing pipeline 54 may produce a tone-mapped sRGB image that has not removed infrared artifacts. If an image sensor with other color filter elements other than red, green, and blue color filter elements are used, standard color processing pipeline 54 may produce a tone-mapped image in those colors.

To produce the tone-mapped sRGB image, standard color processing pipeline 54 may include pedestal subtraction circuitry 56, de-mosaicking circuitry 58, white balance circuitry 60, color correction circuitry 62, and tone-mapping circuitry 64. Pedestal subtraction circuitry 56 may correct the image data produced by RGB-IR sensor 40 based on known pedestal level values. De-mosaicking circuitry 58 may calculate color values at each pixel location of the image based on the image signals produced by the red, green, blue, and IR pixels to produce de-mosaicked image data. White balance circuitry 60 may correct white balance values in the demosaicked image data.

Color correction circuitry 62 may apply a color correction matrix (CCM) to the RGB channels in the color-corrected de-mosaicked image data. The CCM may, for example, extract additional image data from the image data. For example, the CCM may extract colors from the image data that were not directly sampled by image pixels in the array. Additionally, the CCM may convert the RGB image data into standard red, standard green, and standard blue image data (to form the sRGB image). The CCM may be a three-by-three CCM, a four-by-four CCM, or any other desired CCM. In some cases, it may be desired to provide additional noise reduction methods. (e.g., by applying a point filter to the sRGB image data) to further mitigate the noise amplification generated by applying the CCM to the image data.

Tone mapping circuitry 64 may be used to tone-map the color-corrected data and produce a tone-mapped sRGB image.

Additionally, color-processing circuitry 44 may include infrared marking circuitry 66 that determines and marks/labels regions in the tone-mapped sRGB image that have infrared responses over a threshold value fulfill desired criteria. In particular, infrared marking circuitry 66 may include hue angle determination circuitry 68, cell means determination circuitry 70, and NIR ratio determination circuitry 72. Hue angle determination circuitry 68, cell means determination circuitry 70, and NIR ratio determination circuitry 72 may have associated criteria, that may be used by infrared marking circuitry 66 to mark portions of the image that meet the criteria.

Hue angle determination circuitry 68 may calculate a LAB color space image from the tone-mapped sRGB image produced by standard color processing pipeline 54. From the LAB space calculations, hue angle determination circuitry 68 may produce a hue angle image and compare the hue angles within the hue angle image to an expected hue angle range of objects of interest. In other words, the expected hue angle range may be related to the expected hue angle of objects with high infrared or near-infrared reflectivity. More generally, however, the expected hue angle range may be related to the expected hue angle of objects with any desired reflectivity. The expected hue angle range may be determined based on an illuminant spectrum in the scene and the reflectance spectrum of objects of interest. This is a parameter that may be tuned, as desired. For example, the expected hue angle range may be between 0° and 75°, may be between 320° and 360°, or may be any other desired range of hue angles. Hue angle determination circuitry 68 may determine regions of the image that correspond to the expected hue angle range. Although hue angle determination circuitry 78 has been described as using an image in LAB color space, this is merely illustrative. Other color spaces may be used, if desired.

Cell means determination circuitry 70 may calculate a mean signal of the RGB pixels in each pixel unit cell 34. Cell means determination circuitry 70 may base these calculations on the raw RGB-IR image produced by RGB-IR image sensor 40, although cell means determination circuitry 70 may use a partially corrected image produced by a portion of standard color processing pipeline 54 if desired. Pixel unit cell 34 may have four pixels, eight pixels, or any other desired number of pixels. After the mean RGB signal for each unit cell has been calculated, cell means determination circuitry 70 may determine image regions with mean RGB signals within a desired range. The desired mean RGB signal range may correspond with a range of 10%-90% saturation, 20%-80% saturation, 10%-95% saturation, or any other desired range. This is a parameter that may be tuned, as desired. The desired range of mean RGB signals may ensure that portions of the image that are too close to a black level or too close to a saturation level are not considered.

NIR ratio determination circuitry 72 may calculate a ratio between the NIR pixel response in each cell and the mean RGB pixel response in each cell. NIR ratio determination circuitry 72 may base these calculations on the raw RGB-IR image produced by RGB-IR image sensor 40, although NIR ratio determination circuitry 72 may use a partially corrected image produced by a portion of standard color processing pipeline 54 if desired. After calculating an NIR ratio for each unit cell, NIR ratio determination circuitry 72 may determine portions of the image with NIR ratios above a desired threshold. The desired NIR ratio threshold may be greater than 30%, greater than 40%, greater than 50%, less than 60%, greater than 75%, or any other desired NIR ratio threshold. In other words, NIR ratio determination circuitry 72 may determine portions of the image with high NIR reflectance.

Infrared marking circuitry 66 may mark regions of the tone-mapped sRGB image that satisfy the hue angle, cell means, and NIR ratio criteria. In this way, color processing circuitry 44 may produce output image 46 of FIG. 4.

As shown in FIG. 4, output image 46 may include one or more images, including color image 48, which may be, for example, an RGB image with NIR correction. Additionally, output image 46 may include an RGB image with markings 50 on regions of the image with infrared reflectance over a desired threshold (e.g., regions that satisfy the hue angle, cell means, and NIR ratio criteria). For example, output image 46 may appear as a standard RGB image with green (or any other color or pattern) markings in regions that have high infrared reflectance or otherwise match the desired reflectance characteristics. This may be beneficial in machine vision systems to distinguish between areas with the selected reflectance signature and other areas in the scene. In one example, machine vision systems in agricultural applications may be required to distinguish between foliage and other objects or to identify specific plants at a certain stage of their life cycle agriculture may exhibit high infrared reflectance relative to other portions of an image scene (i.e., plants have high NIR reflectance due to the chlorophyll in their leaves. However, this is merely illustrative. In general, an image with markings for regions with a known reflectance may be used in any desired application.

Output image 46 may also include an NIR image 51 and color image with NIR artifacts 53. In particular, NIR image 51 may be formed using the infrared signals generated by the infrared pixels in array 20. Color image with NIR artifacts 53 may be an RGB image that has not been corrected using the infrared signals. In general, any or all of color image 48, color image with NIR markings 50, NIR image 51, and color image with NIR artifacts 53 may be produced.

Figure 7:
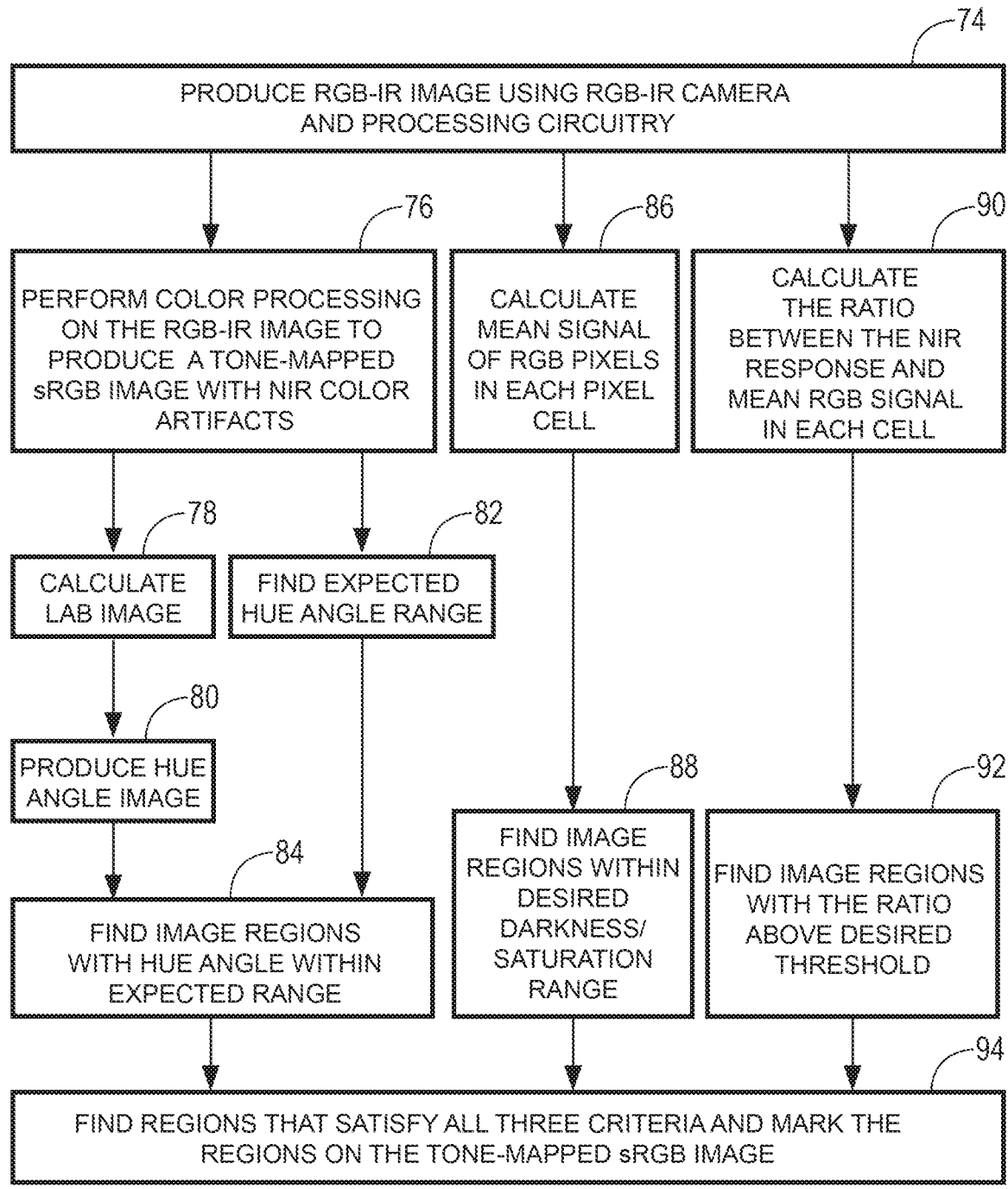
FIG. 7 is a flowchart of illustrative steps that may be used to produce an infrared-labeled image in accordance with an embodiment.

A flowchart illustrating the steps that may be used by camera 12, including color processing circuitry 44, to produce the infrared-labeled tone-mapped sRGB image 46 is shown in FIG. 7. As shown in FIG. 7, at step 74, camera 12 with RGB-IR sensor 40 may be used to produce a raw RGB-IR image.

At step 76, standard color processing pipeline 54 of camera 12 may be used to produce a tone-mapped sRGB image with NIR artifacts. The details of step 76 are shown in FIG. 8.

Figure 8:
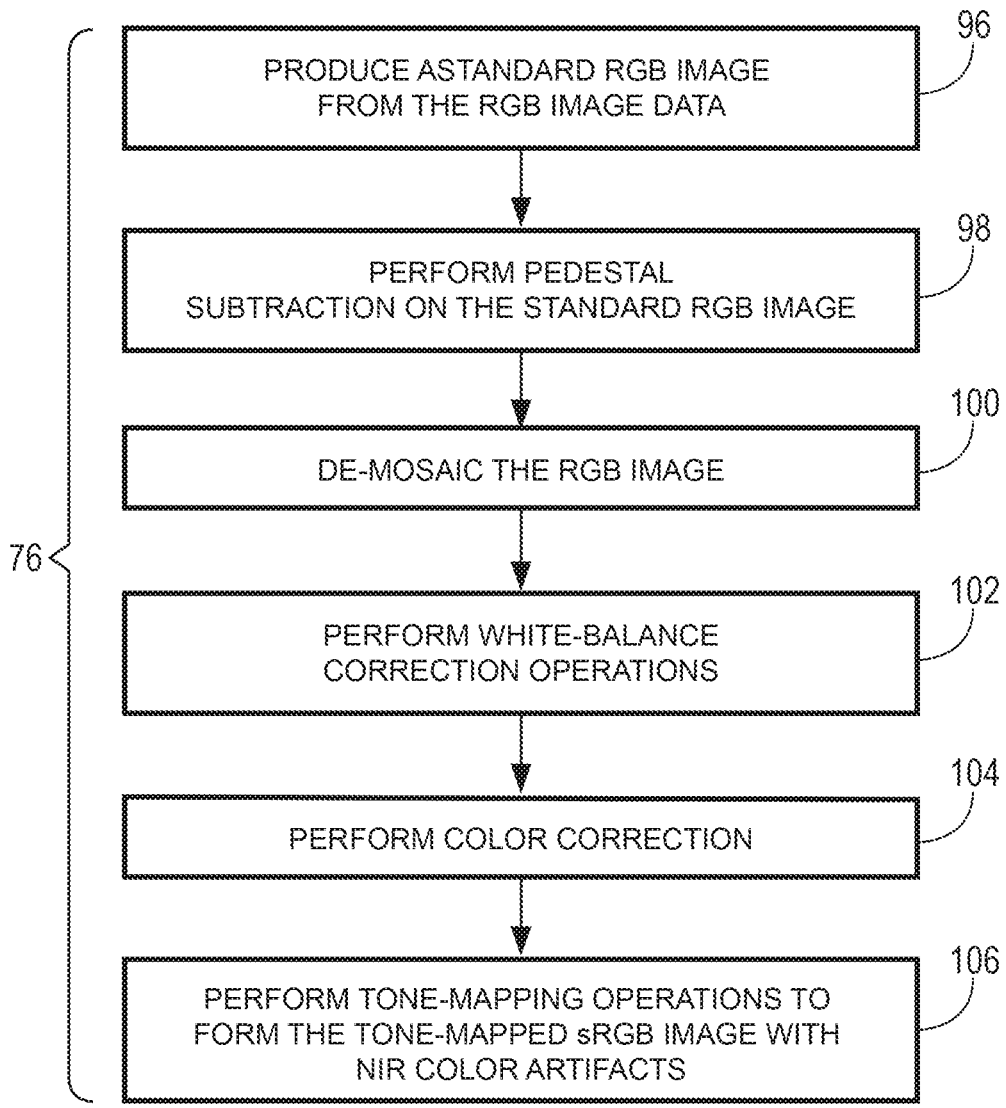
FIG. 8 is a flowchart of illustrative steps that may be used to convert a standard RGB image into a tone-mapped sRGB image in accordance with an embodiment.

As shown in FIG. 8, at step 96, a standard RGB image may be produced from the image data produced by RGB-IR sensor 40.

At step 98, pedestal subtraction circuitry 56 may be used to correct the image data produced by RGB-IR sensor 40 based on known pedestal level values (e.g., pedestal subtraction circuitry 56 may subtract the known pedestal levels from the image data).

At step 100, de-mosaicking block 58 may be used to calculate color values at each pixel location of the image based on the image signals produced by the red, green, blue, and IR pixels to produce de-mosaicked image data.

At step 102, white balance circuitry 60 may be used to apply white balance values in the de-mosaicked RGB image.

At step 104, color correction circuitry 62 may be used to apply a color correction matrix (CCM) to the de-mosaicked white-balanced image data. The CCM may, for example, extract additional image data from the demosaicked image data. For example, the CCM may extract colors from the image data that were not directly sampled by image pixels in the array. Additionally, the CCM may convert the image data into standard red, standard green, and standard blue image data (to form the sRGB image). In some cases, it may be desired to provide additional noise reduction (e.g., by applying a point filter to the sRGB image data) to further mitigate the noise amplification generated by applying the CCM to the image data.

At step 106, tone mapping circuitry 64 may be used to tone-map the color-corrected image data to produce tone-mapped color-corrected image data.

As shown in FIG. 7, at step 78, hue angle determination circuitry 68 may calculate a LAB color space image of the tone-mapped sRGB image. In other words, hue angle determination circuitry 68 may convert the image data associated with the tone-mapped sRGB image into LAB color space. However, any other color space may be used, if desired.

At step 80, hue angle determination circuitry 68 may produce a hue angle image in LAB or other color space that corresponds to the tone-mapped sRGB image.

At step 82, in parallel with steps 78 and 80, hue angle determination circuitry 68 may find an expected hue angle range of one or more objects of interest in the sRGB image. To find this expected range, hue angle determination circuitry 78 may determine objects of interest with high infrared or near-infrared reflectively, and the expected hue angle range may be determined based on an illuminant spectrum of the sRGB image and the reflectance of the objects in interest. For example, the expected hue angle range may be between 0° and 75°, may be between 320° and 360°, or may be any other desired range of hue angles.

At step 84, hue angle determination circuitry 68 may find image regions that correspond to the expected hue angle range determined at step 82. In other words, hue angle determination circuitry 68 may analyze the hue angle image produced at step 80 and find regions within the expected hue angle range.

In parallel with steps 76-84, at step 86 cell means determination circuitry 70 may calculate a mean signal of the RGB pixels in each pixel unit cell 34. Cell means determination circuitry 70 may base these calculations on the raw RGB-IR image produced by RGB-IR image sensor 40, although cell means determination circuitry 70 may use a partially corrected image produced by a portion of standard color processing pipeline 54 at step 76, if desired. Pixel unit cell 34 may have four pixels, eight pixels, or any other desired number of pixels.

At step 88, cell means determination circuitry 70 may determine image regions with mean RGB signals within a desired range. The desired mean RGB signal range (also referred to as a saturation range herein) may correspond with a range of 10%-90% saturation, 20%-80% saturation, 10%-95% saturation, or any other desired range. For example, the desired range of mean RGB signals may ensure that portions of the image that are too dark or too saturated are not considered.

In parallel with steps 76-84 and steps 86-88, at step 90, NIR ratio determination circuitry 72 may calculate a ratio between the NIR pixel response in each cell and the visible light response in each cell (e.g., the mean signal of the RGB pixels in each cell). NIR ratio determination circuitry 72 may base these calculations on the raw RGB-IR image produced by RGB-IR image sensor 40, although NIR ratio determination circuitry 72 may use a partially corrected image produced by a portion of standard color processing pipeline 54 at step 76, if desired.

At step 92, NIR ratio determination circuitry 72 may determine portions of the image with NIR ratios above a desired threshold. The desired NIR ratio threshold may be greater than 30%, greater than 40%, greater than 50%, less than 60%, greater than 75%, or any other desired NIR ratio threshold. In this way, NIR ratio determination circuitry 72 may determine portions of the image with high NIR reflectance.

At step 94, infrared marking circuitry 66 may find regions that satisfy the hue angle range criteria of step 84, the cell means range criteria of step 88, and the NIR ratio threshold criteria of step 92. Infrared marking circuitry 66 may then mark regions of the tone-mapped sRGB image that satisfy all three criteria to produce an NIR-labeled tone-mapped sRGB image.

Figure 9:
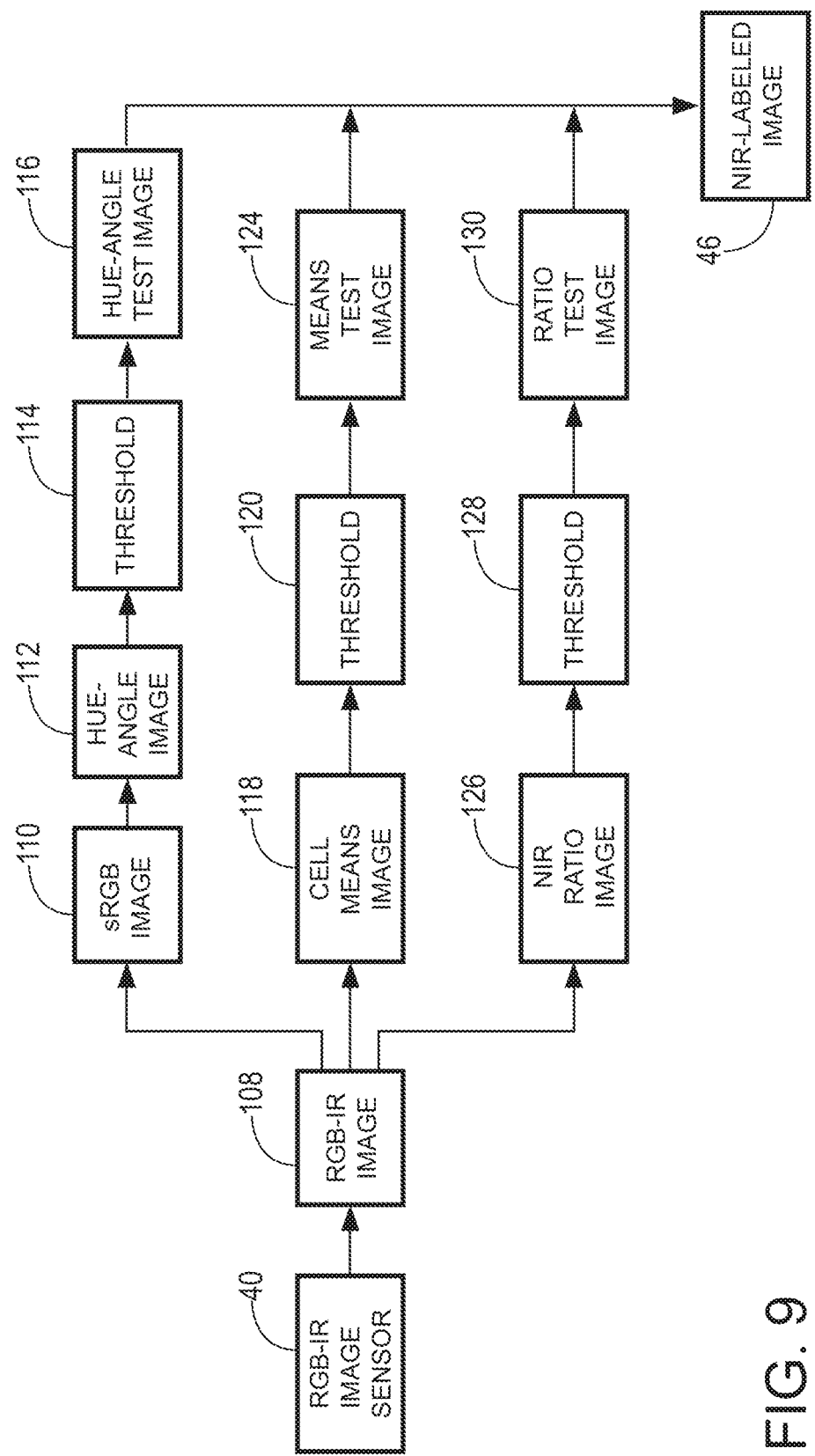
FIG. 9 is a diagram of an illustrative image processing pipeline that may be used to produce an infrared-labeled image in accordance with an embodiment.

An image processing pipeline that may be used by camera 12 to produce an NIR-labeled tone-mapped sRGB image (e.g., using the steps shown in FIG. 7), is shown in FIG. 9. As shown in FIG. 9, camera 12 may include RGB-IR image sensor 40, which may produce RGB-IR image 108. RGB-IR image 108 may be referred to as a raw RGB-IR image herein.

From RGB-IR image 108, sRGB image 110 (e.g., a tone-mapped sRGB image) may be produced. Tone-mapped sRGB image 110 may be produced using standard color processing pipeline 54 with steps 96-106 described in connection with FIG. 8.

From tone-mapped sRGB image 110, hue angle image 112 may be produced. Hue angle image 112 may be produced using hue angle determination circuitry 68 with steps 78 and 80 described in connection with FIG. 7. In particular, hue angle image 112 may be produced by converting tone-mapped sRGB image 110 into LAB color space.

Based on hue angle image 112 and sRGB image 110, threshold 114 may then be determined. In particular, hue angle determination circuitry 68 may determine threshold 114, which may correspond to an expected hue angle range of objects of interest (e.g., objects with high infrared or near-infrared reflectivity) within the images. The expected hue angle range may be determined based on an illuminant spectrum in the image and the reflectance of objects in the image.

Based on hue angle image 112 and threshold 114, hue angle test image 116 may be produced. In particular, hue angle determination circuitry 68 may identify regions of hue angle image 112 with hue angles within the hue angle range and mark/label those regions to produce hue angle test image 116.

In parallel with the production of sRGB image 110, cell means image 118 may be produced from raw RGB-IR image 108. Cell means image 118 may be produced by cell means determination circuitry 70 with step 86 described in connection with FIG. 7. In particular, cell means image 118 may be produced by calculating a mean signal of the RGB pixels in each pixel unit 34.

Threshold 120 may be determined to set a desired RGB mean signal range. In particular, threshold 120 may ensure that portions of the image that are too dark or too saturated are not considered.

Based on cell means image 118 and threshold 120, means test image 124 may be produced. In particular, cell means determination circuitry 70 may identify regions of cell means image 118 with cell means within the desired range and mark/label those regions to produce means test image 124.

In parallel with the production of sRGB image 110 and cell means image 118, NIR ratio image 126 may be produced from raw RGB-IR 108. NIR ratio image 126 may be produced by NIR ratio determination circuitry 72 with step 90 described in connection with FIG. 7. In particular NIR ratio 126 may be produced by calculating ratios between infrared and visible signals in each pixel unit cell.

Threshold 128 may be determined to set a desired NIR ratio threshold. Threshold 128 may ensure that only portions of the image with high NIR reflectance are considered.

Based on NIR ratio image 126 and threshold 128, ratio test image 130 may be produced. In particular, NIR ratio determination circuitry 72 may identify regions of NIR ratio image 126 with NIR ratios over the NIR ratio threshold 128 and mark/label those regions to produce ratio test image 130.

Based on hue angle test image 116, means test image 124, and ratio test image 130, NIR-labeled image 46 may be produced. In particular, infrared marking circuitry 66 may mark regions of tone-mapped sRGB image 110 that are marked/labeled in all three of angle test image 116, means test image 124, and ratio test image (e.g., regions that meet the hue angle, cell means, and NIR ratio criteria). An example of infrared-marked tone-mapped sRGB image 50 is shown in FIG. 10.

Figure 10:
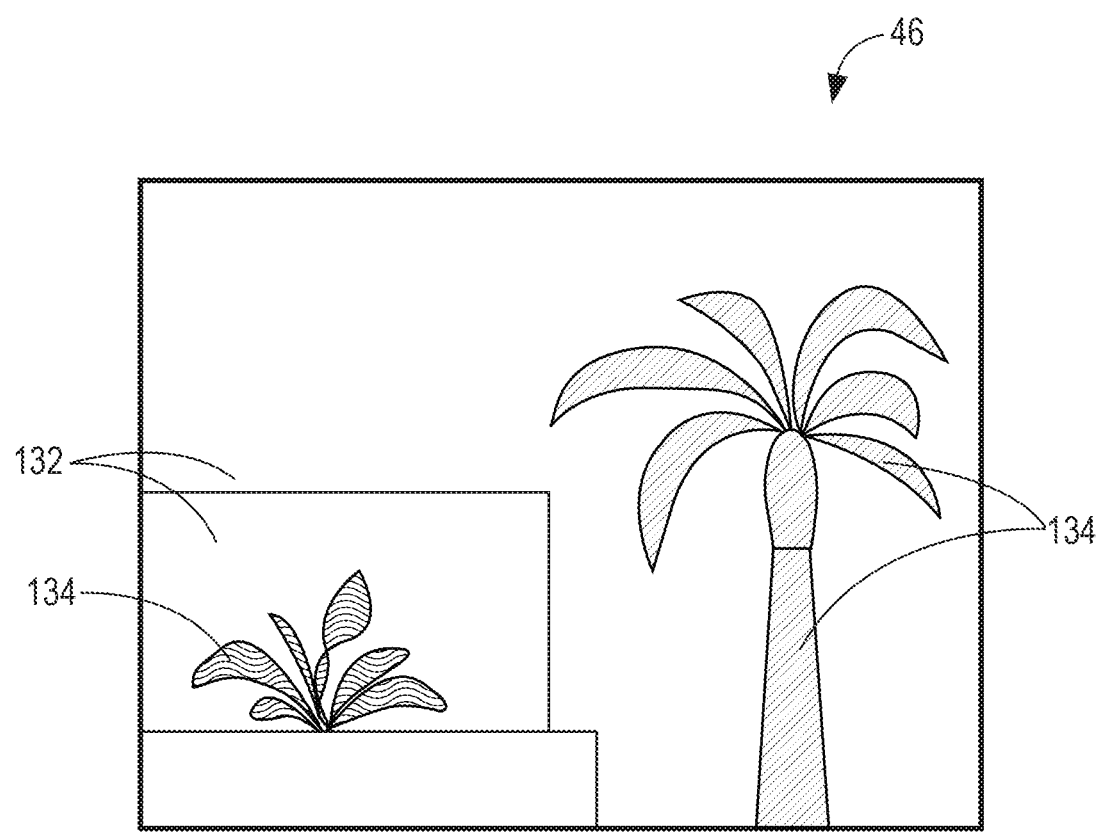
FIG. 10 is a diagram of an illustrative infrared-labeled image in accordance with an embodiment.

As shown in FIG. 10, output image 50 may have infrared-marked regions 134 and non-marked regions 132. In particular, infrared-marked regions 134 (shown with hashed lines) may correspond to regions in the image that meet the hue angle, cell means, and NIR ratio criteria, while non-marked regions 132 may correspond to regions that do not meet all three criteria. In this way, infrared-marked regions 134 may correspond to regions of image 46 with high infrared reflectance or otherwise fulfill the three criteria. Infrared-marked regions 134 may be marked using a green color for example. However, any desired color or pattern may be used to identify infrared-marked regions 132 in image 46.

Output image 46 may be outputted to a machine vision system to distinguish between areas with high infrared reflectance or areas with other desired reflectance properties and other areas. In one example, foliage and other agriculture may exhibit high infrared reflectance relative to other portions of an image scene (i.e., due to the chlorophyll in the leaves of the plants that absorbs visible light but reflects infrared light), and it may be desirable to mark/label the foliage for use with a machine vision system. However, this is merely illustrative. In general, an image with markings for regions with high-infrared reflectance may be outputted to a display, may be used to mark other objects with high infrared reflectivity, or used in any desired application.

Although all of the embodiments have been described as including hue angle determination circuitry, cell means determination circuitry, and NIR ratio determination circuitry, the infrared marking circuitry may include some or all of this circuitry. Alternatively or additionally, output image 50 may have marked regions that meet hue angle, cell means, and NIR ratio criteria, meet some of the criteria (e.g., two of the three criteria), or meet the criteria within a desired tolerance.

Moreover, the embodiments described have been related to marking regions of an image with high infrared and/or near-infrared reflectance. When "infrared" is used throughout the specification, the term is intended to encompass both infrared and near-infrared wavelengths. Any near-infrared identification or determination may instead be performed for infrared wavelengths. Additionally, other wavelengths outside of the visible range may be marked, such as ultraviolet wavelengths. In general, any desired multi-spectral images may be produced.

Additionally, although each of the images described herein have been RGB-IR images, colors other than RGB may be used. Image sensor 40 may include cyan, yellow, broadband, white, and any other color image sensor pixels.

Although each of the embodiments include circuitry, such as processing circuitry, circuitry may mean physical circuitry or digital circuitry. For example, if digital pixels are used, digital circuitry may be used to process the signals produced by the digital pixels.

In accordance with various embodiments, an imaging system may include an image sensor that includes infrared pixels and color processing circuitry that includes infrared-marking circuitry. The infrared-marking circuitry may include hue angle determination circuitry, cell means determination circuitry, and near-infrared determination circuitry.

In accordance with an embodiment, the color processing circuitry may output an infrared-marked tone-mapped image.

In accordance with an embodiment, the infrared-marked tone-mapped image may be an infrared-marked tone-mapped standard red, green, and blue image.

In accordance with an embodiment, the color processing circuitry may further include a standard color processing pipeline.

In accordance with an embodiment, the standard color processing pipeline may include pedestal subtraction circuitry, white balance circuitry, de-mosaicking circuitry, color correction circuitry, and tone-mapping circuitry.

In accordance with an embodiment, the image sensor may further include red, green, and blue image pixels and the standard color processing pipeline may produce a tone-mapped standard red, green, and blue image.

In accordance with an embodiment, the hue angle determination circuitry may produce a hue angle test image with regions marked that fall within an expected hue angle range.

In accordance with an embodiment, the cell means determination circuitry may produce a means test image with regions marked that fall within a signal level range.

In accordance with an embodiment, the near-infrared ratio determination circuitry may produce a ratio test image with regions marked that exceed a near-infrared ratio threshold.

In accordance with an embodiment, the infrared-marked tone-mapped standard red, green, and blue image may have marked regions that fall within the expected hue angle range, fall within the saturation range, and that exceed the near-infrared ratio threshold.

In accordance with an embodiment, the imaging system may further include a dual-band filter with a first pass band across visible wavelengths and a second pass band across a portion of near-infrared wavelengths.

In accordance with various embodiments, a method of operating a red, green, blue, and infrared imaging system may include producing a red, green, blue, and infrared image using an image sensor having red, green, blue, and infrared pixels, performing color processing on the red, green, and blue image to produce a tone-mapped standard red, green, and blue image with near-infrared color artifacts, determining image regions having a hue angle within an expected range, determining image regions within a defined signal range, determining image regions with a near-infrared ratio above a threshold, and marking regions of the tone-mapped standard red, green, and blue image that have the hue angle within the expected range, fall within the signal range, and are above the near-infrared ratio threshold.

In accordance with an embodiment, determining the image regions having the hue angle within the expected range includes calculating an image in LAB color space from the tone-mapped color image, producing a hue angle image based on the image in LAB color space, determining an expected hue angle range for objects of interest based on their reflectivity and illumination spectrum in the scene.

In accordance with an embodiment, determining the image regions within the saturation range may include determining a mean signal of the red, green, and blue pixels within each unit cell of pixels in the image sensor.

In accordance with an embodiment, determining the image regions with near-infrared ratios above the threshold may include determining the ratio between a near-infrared pixel response and the mean signal of the red, green, and blue pixels within each cell of pixels in the image sensor.

In accordance with an embodiment, the method may further include outputting the infrared-marked color image to a machine vision system.

In accordance with an embodiment, marking the regions of the tone-mapped color image may include marking the regions of the image that have high-infrared reflectivity and that correspond to foliage in an image scene (e.g., that fulfill all the required conditions of falling within the expected hue angle range, fall within the saturation range, and are above the near-infrared ratio threshold).

In accordance with various embodiments, an imaging device that outputs an infrared-marked tone-mapped color image may include an image sensor having an array of red, green, blue, and infrared pixels that respectively produce red, green, blue, and infrared image signals, a dual-band filter having visible light and near-infrared light pass bands, and color processing circuitry that produces the infrared-marked tone-mapped color image.

In accordance with an embodiment, the color processing circuitry may include hue angle determination circuitry, cell means determination circuitry, and near-infrared ratio determination circuitry that collectively determines regions of the image to mark.

The foregoing is merely illustrative and various modifications can be made to the described embodiments. The foregoing embodiments may be implemented individually or in any combination.

What is claimed is:

1. An imaging system comprising:
   an image sensor that includes infrared pixels; and
   color processing circuitry that includes a standard color processing pipeline and infrared-marking circuitry, wherein the infrared-marking circuitry comprises:
      hue angle determination circuitry, wherein the standard color processing pipeline is interposed between the image sensor and the hue angle determination circuitry,
      cell means determination circuitry, and
      near-infrared determination circuitry.

2. The imaging system defined in claim 1 wherein the color processing circuitry is configured to output an infrared-marked tone-mapped color image.

3. The imaging system defined in claim 2 wherein the infrared-marked tone-mapped color image is an infrared-marked tone-mapped standard red, green, and blue image.

4. The imaging system defined in claim 2 wherein the standard color processing pipeline comprises:
   pedestal subtraction circuitry,
   white balance circuitry,
   de-mosaicking circuitry,
   color correction circuitry, and
   tone-mapping circuitry.

5. The imaging system defined in claim 2 wherein:
   the image sensor further includes red, green, and blue image pixels, and
   the standard color processing pipeline is configured to produce a tone-mapped standard red, green, and blue image.

6. The imaging system defined in claim 2 wherein the hue angle determination circuitry is configured to produce a hue angle test image with marked regions that fall within an expected hue angle range.

7. The imaging system defined in claim 6 wherein the cell means determination circuitry is configured to produce a means test image with marked regions that fall within a signal level range.

8. The imaging system defined in claim 7 wherein the infrared-marked tone-mapped image has marked regions that fall within the expected hue angle range, fall within the signal level range, and that exceed the near-infrared ratio threshold.

9. The imaging system defined in claim 6 wherein the near-infrared ratio determination circuitry is configured to produce a ratio test image with marked regions that exceed a near-infrared ratio threshold.

10. The imaging system defined in claim 1 further comprising:
    a filter with two or more pass bands, wherein a first pass band is across the visible band and the other pass bands are across portions of near-infrared wavelengths.

11. A method of operating an imaging system, the method comprising:
    producing an image using an image sensor having repeating unit cells of pixels, including infrared pixels;
    performing color processing on the image to produce a color tone-mapped image with near-infrared color artifacts;
    determining image regions having a hue angle within an expected range, including determining the hue angle based on the color tone-mapped image with the near-infrared color artifacts;
    determining image regions within a selected signal range;
    determining image regions with a near-infrared ratio above a threshold; and
    marking regions of the tone-mapped image that have the hue angle within the expected range, fall within the selected signal range, and are above the near-infrared ratio threshold.

12. The method defined in claim 11 wherein:
    producing the image comprises producing a red, green, blue, and infrared image, and
    performing the color processing on the image comprises producing a tone-mapped standard red, green, and blue image with near-infrared color artifacts.

13. The method defined in claim 12 wherein determining the image regions having the hue angle within the expected range comprises:
    calculating an image in LAB color space from the tone-mapped standard red, green, and blue image;
    producing a hue angle image based on the image in LAB color space; and
    determining an expected hue angle range for objects of interest based on reflectivity and spectrum of scene illumination.

14. The method defined in claim 13 wherein determining the image regions with near-infrared ratios above the threshold comprises:
    determining a ratio between the near-infrared pixel response and the mean signal of the red, green, and blue pixels within each unit cell of pixels in the image sensor.

15. The method defined in claim 12 wherein determining the image regions within the selected signal range comprises:
    determining a mean signal of the red, green, and blue pixels within each unit cell of pixels in the image sensor.

16. The method defined in claim 11 further comprising:
    outputting the infrared-marked color tone-mapped image to a machine vision system or a display.

17. The method defined in claim 16 wherein marking the regions of the tone-mapped color image comprises marking the regions of the image that have high-infrared reflectivity and that correspond to foliage in an image scene.

18. An imaging device comprising:
    an image sensor having an array of red, green, blue, and infrared pixels that respectively produce red, green, blue, and infrared image signals for an image;
    a dual-band filter having visible light and near-infrared light pass bands that filters light incident on the image sensor; and
    processing circuitry configured to generate a tone-mapped color image based on the image,
    to add markings to a portion of the tone-mapped color image that indicate infrared information,
    and to output the tone-mapped color image containing the added markings that indicate the infrared information,
    wherein the processing circuitry comprises hue angle determination circuitry and a standard color processing pipeline coupled between the image sensor and hue angle determination circuitry.

19. The imaging device defined in claim 18 wherein the processing circuitry comprises:
   cell means determination circuitry, and
   near-infrared ratio determination circuitry, wherein the added markings are based on output from the hue angle determination circuitry, the cell means determination circuitry, and the near-infrared ratio determination circuitry.

20. The imaging device defined in claim 18 wherein the added markings in the tone-mapped color image indicate infrared reflectivity at the portion of the tone-mapped color image.

\* \* \* \* \*